United States Patent [19]

Vella

[11] Patent Number: 4,510,770
[45] Date of Patent: Apr. 16, 1985

[54] CHEST FOR STORING, COOLING AND DISPENSING COMESTIBLES

[75] Inventor: Paul L. Vella, Westland, Mich.

[73] Assignees: Thomas K. Ziegler; David J. Lucas, both of Detroit, Mich.

[21] Appl. No.: 478,927

[22] Filed: Mar. 25, 1983

[51] Int. Cl.³ .............................................. F25D 3/02
[52] U.S. Cl. ..................................... 62/464; 221/281
[58] Field of Search ............... 62/459, 463, 464, 371, 62/457; 221/281, 150 R

[56] References Cited

U.S. PATENT DOCUMENTS

| | | | |
|---|---|---|---|
| 553,175 | 1/1896 | McNeil | 62/464 X |
| 770,969 | 9/1904 | Johns | 62/464 X |
| 1,771,933 | 7/1930 | Lehrman | 62/464 |
| 2,180,460 | 11/1939 | Earle | 62/258 |
| 2,393,238 | 1/1946 | Dailey | 62/258 |
| 2,427,230 | 9/1947 | Salzmann | 62/261 |
| 2,724,951 | 11/1955 | Arce | 62/464 X |
| 3,106,074 | 10/1963 | Amburgey, Jr. | 62/464 |
| 3,533,536 | 10/1970 | Baxendale | 221/281 |

Primary Examiner—Lloyd L. King
Attorney, Agent, or Firm—Thomas K. Ziegler

[57] ABSTRACT

A portable ice chest includes a food compartment and a pair of side-by-side, curved chutes for dispensing beverage containers by gravity through the first wall of the chest. A segregated ice compartment cools both the food compartment and the container chute. Access to both the ice and food compartments is gained through either a lid on the top of the chest or a door in the side of the chest. A separate door in the front of the chest allows access to a dispensing station to which the containers are delivered by the chutes. One embodiment of the chest includes a seat and backrest to allow an individual to employ the chest as a seat.

21 Claims, 16 Drawing Figures

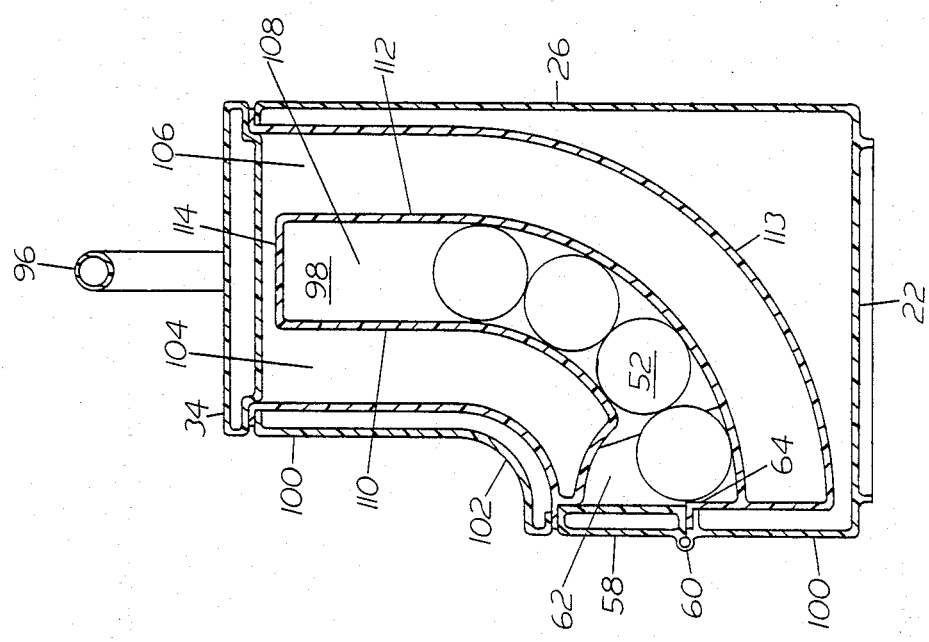
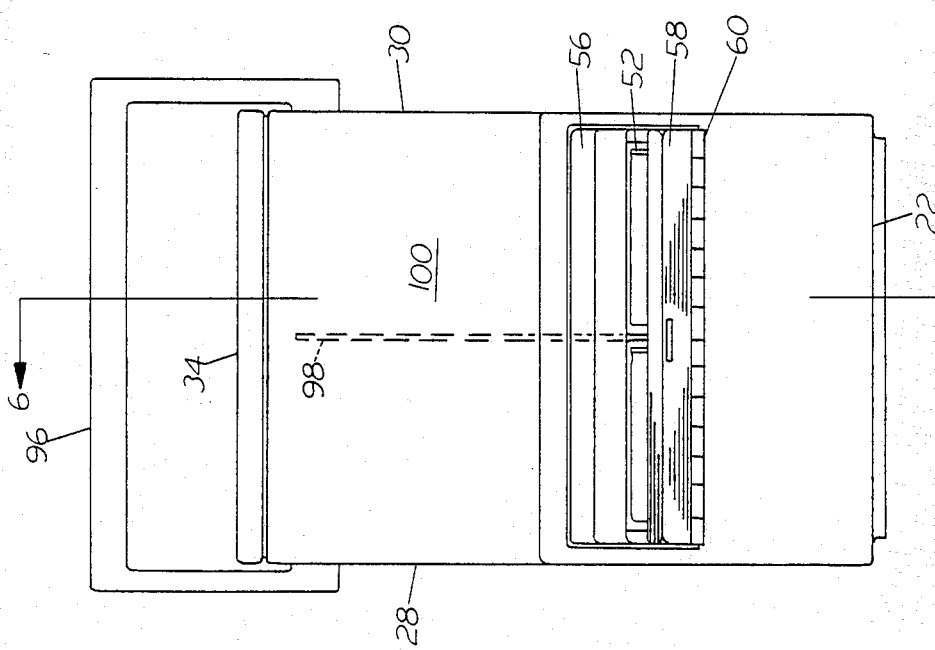

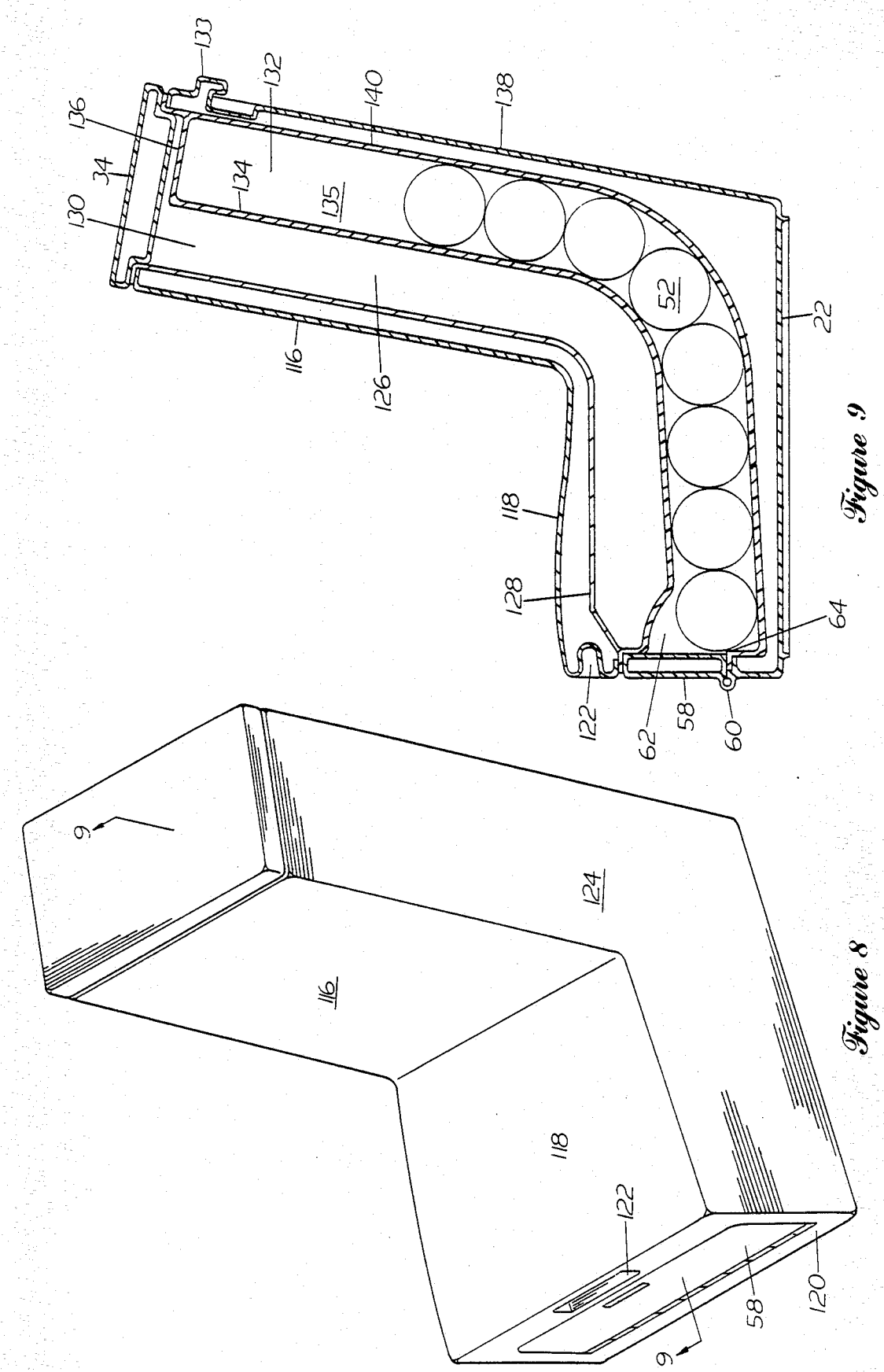

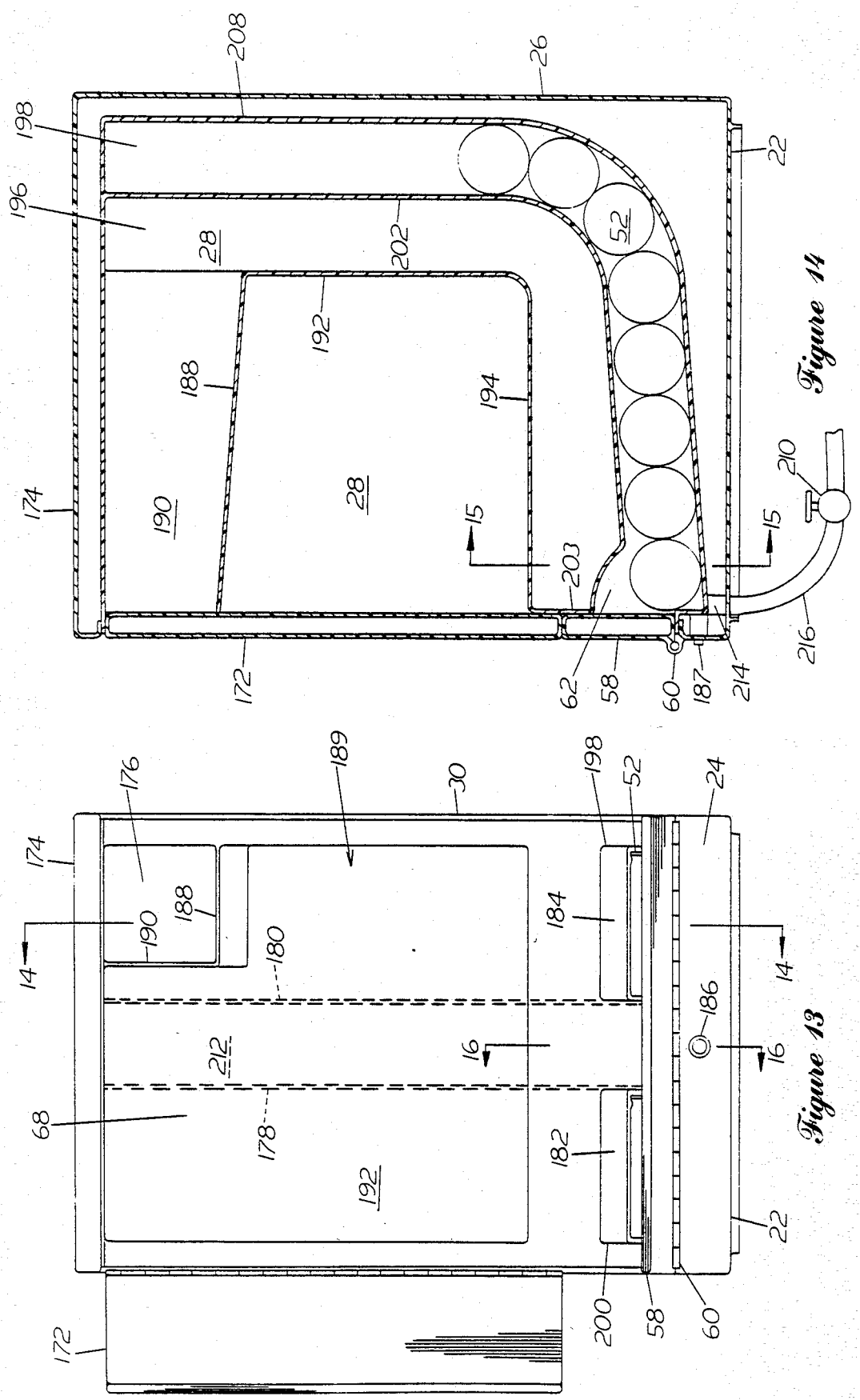

CHEST FOR STORING, COOLING AND DISPENSING COMESTIBLES

DESCRIPTION

1. Technical Field

The present invention broadly relates to food chests, especially of the portable type employing ice to cool the contents, and deals more particularly with a chest which includes a food compartment and a segregated beverage container dispenser.

2. Background Art

Various types of ice chests have been devised in the past for cooling and storing comestibles. As used herein, the term "comestibles" is intended to mean both food products and beverages.

Conventional ice chests in the past have typically employed a single compartment in which foods as well as beverages were stored along with a quantity of ice. This arrangement is undesirable because the foods are exposed to moisture created by the melting ice. In order to partially alleviate this problem, shelfs have been provided in the foods/ice compartment to segregate those foods sensitive to moisture from the melting ice. Nevertheless, the quantity of food which may be stored on such shelves is limited and other problems remain with this arrangement. For example, beverage containers are normally randomly disposed at the bottom of the food compartment beneath a quantity of ice and it is therefore necessary to reach beneath the level of the ice to search for a desired beverage container. In some cases, this necessitates removing the lid of the ice chest as well as a food shelf before access may be gained to the bottom of the food compartment. This arrangement is therefore not only inconvenient and time consuming but allows cool air to escape from the ice chest when the lid is removed.

Another disadvantage of prior art chests related to those above is the fact that different kinds of beverage containers, such as cans of hard and soft drinks can not be conveniently segregated in a manner which allows the user to quickly select the appropriate beverage.

Another disadvantage of the prior art involves the fact that the ice employed to cool the comestibles is located in a concentrated area within the food compartment and therefore is somewhat inefficient in cooling all areas of the food compartment.

It is well known that portable ice chests of the general type described above are often used as seats when made of rigid materials such as fiberglass and steel. Although these prior art ice chests perform satisfactory as a bench-type seat, they are not comfortable and do not provide either a proper contour for supporting the human anatomy or a backrest against which the user could recline.

INDUSTRIAL APPLICABILITY

It is therefore a primary object of the present invention to overcome each of the difficiencies inherent in prior art ice chests of the type described above.

Further important object of the present invention is to provide a chest for storing and cooling comestibles in which beverage containers are segregated from food items and may be conveniently and rapidly removed from the chest without the need for disturbing food items.

Another object of the invention is to provide an ice chest of the type described above which is portable and in which a segregated compartment is provided for storing ice therein.

A further object of the invention is to provide an ice chest as described above in which containers of beverages are dispensed through a gravity chute to a door in the side of the chest.

Another object of the inventiomn is to provide an ice chest as described above wherein the ice compartment is distributed over a relatively wide area to provide more uniform cooling of both food items and beverage containers.

Another object of the invention is to provide an ice chest as described above which prevents contact between melting ice and the comestibles being cooled.

A still further object of the present invention is to provide an ice chest as described above having an opening therein through which access may be gained to both a food compartment and an ice compartment.

Another object of the present invention is to provide an ice chest of the type described above in which two types of beverage containers are independently dispensed.

A still further object of the present invention is to provide an ice chest as described above having an arcuately shaped chute for successively dispensing a plurality of beverage containers and an ice compartment substantially co-extensive with the chute for cooling all of the containers.

Another object of the invention is to provide an ice chest as described above having external surfaces configured to provide a seat including a backrest to support the human anatomy.

In accordance with the present invention, a portable ice chest includes a food compartment and pair of side-by-side, curved chutes for sequentially dispensing beverage containers under the influence of gravity through the front wall of the chest. A segregated ice compartment cools both the beverage containers in the chutes and food items in the food compartment. Access to both the food and ice compartments may be gained through a lid on top of the chest or a door in the side of the chest. A separate swingable door in the front of the chest allows access to a dispensing station where the containers are delivered by the chutes. One embodiment of the ice chest includes external surface areas configured to define a seat including a backrest conforming to the human anatomy.

BRIEF DESCRIPTION OF THE DRAWINGS

In the drawings, which form an integral part of the specification and are to be read in conjunction therewith, and in which like reference numerals are employed to designate substantially identical components in the various views:

FIG. 5 is a front view of another form of the ice chest, with the beverage dispensing door shown in the open position;

FIG. 6 is a sectional view taken along the line 6—6 of FIG. 5 but showing the beverage dispensing door in the closed position;

FIG. 8 is a perspective view of still another form of the ice chest of the present invention;

FIG. 9 is a sectional view taken along the line 9—9 in FIG. 8;

FIG. 13 is a front view of still another form of an ice chest of the present invention, with the access door and beverage dispensing door shown in an open position;

FIG. 14 is a sectional view taken along the line 14—14 in FIG. 13, but showing the access door and beverage dispensing door in a closed position;

BEST MODE FOR CARRYING OUT THE INVENTION

Figure 2:
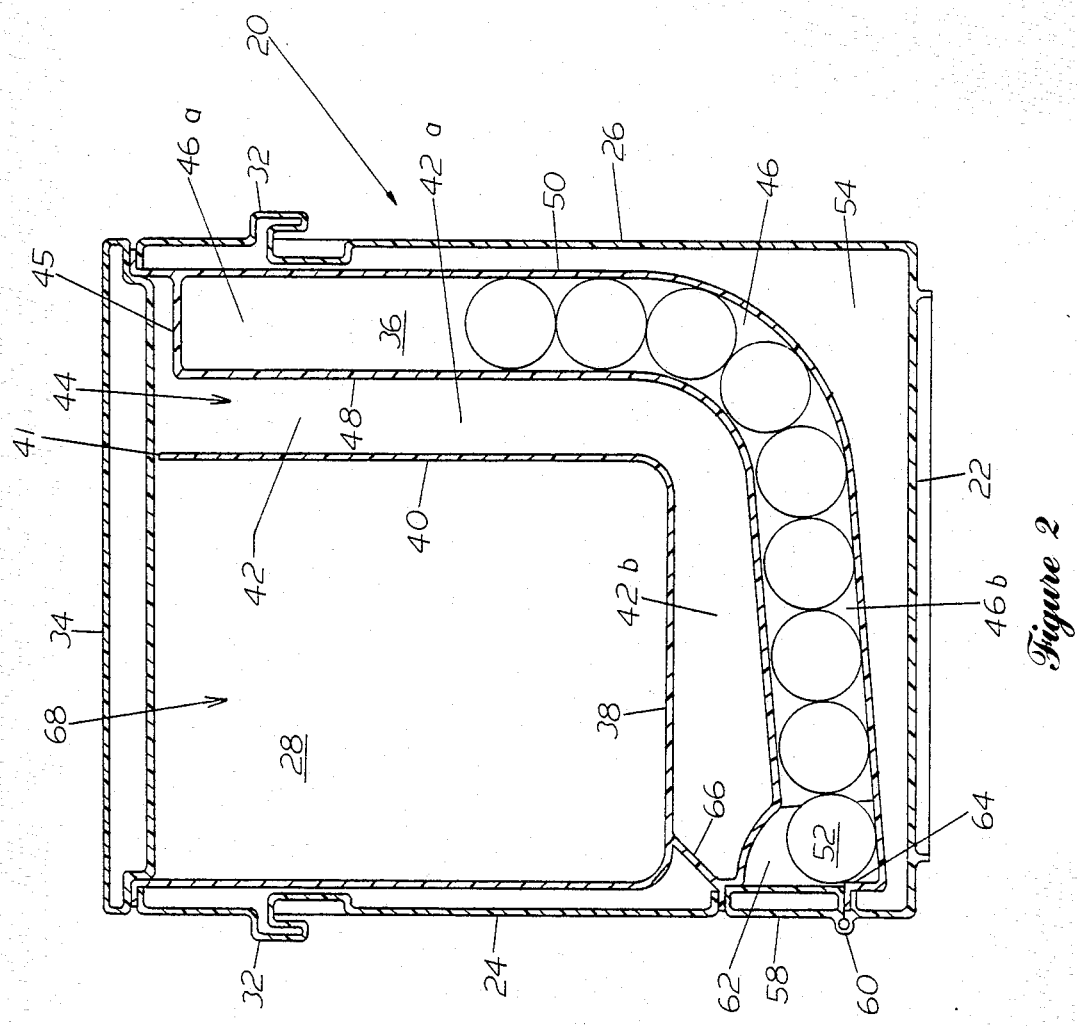
FIG. 2 is a sectional view taken along the line 2—2 of FIG. 1, but with the beverage dispensing door shown in the closed position.
Figure 1:
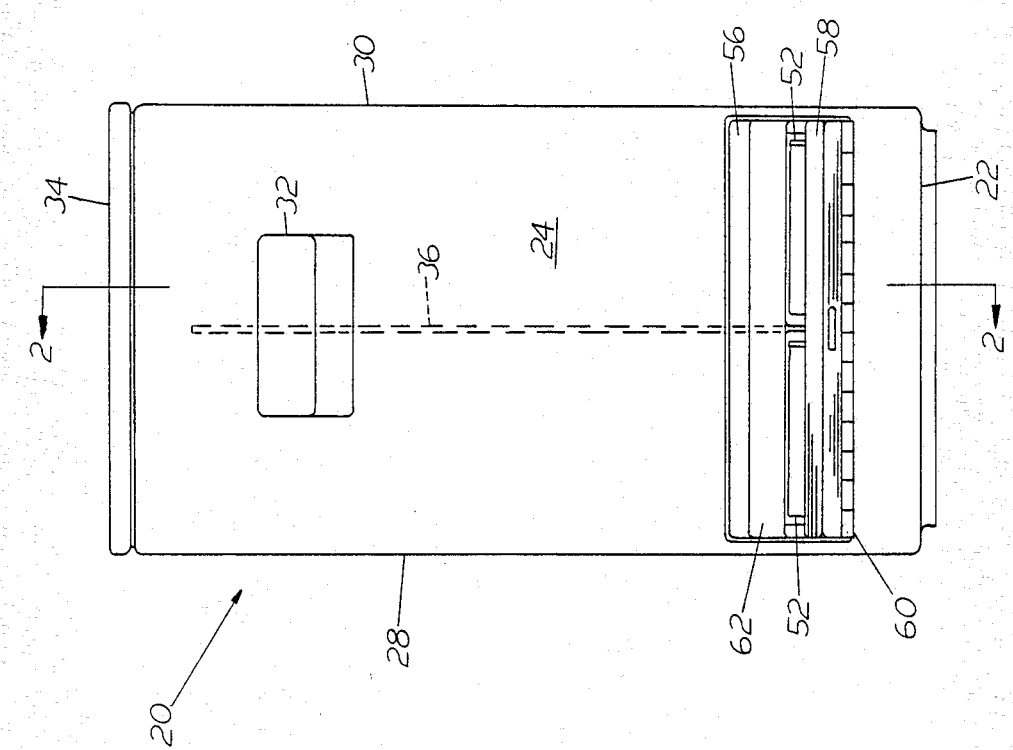
FIG. 1 is a front view of a portable ice chest which forms the preferred embodiment of the present invention, with the beverage door shown in an open position.
Figure 3:
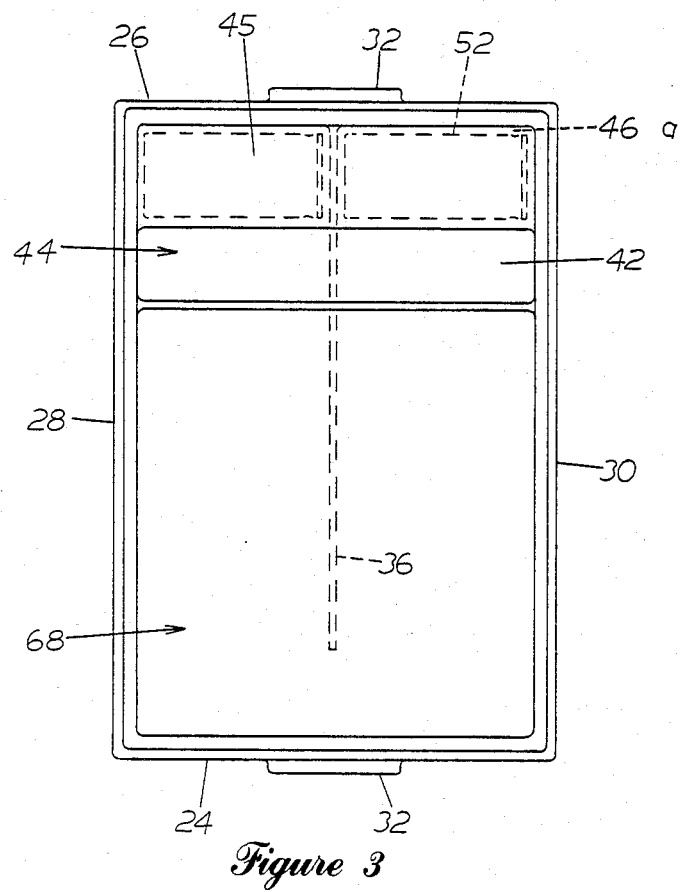
FIG. 3 is a top plan view of the ice chest shown in FIG. 1 but with the lid removed.

Referring first to FIGS. 1-3, the present invention generally involves a chest 20 for storing, cooling and dispensing comestibles. The chest 20 includes a front wall 24, a rear wall 26, a pair of sidewalls 28, 30 and a bottom joined together to form an enclosure. A lid 34 is removably mounted by means of interlocking edges of the top of the enclosure. A pair of handles 32 are integrally molded in the front and rear walls 24, 26. The enclosure thus far described is preferably of double wall construction and may be provided with insulation between the double walls thereof to minimize heat transfer therethrough. The enclosure may be manufactured of steel, rigid fiberglass or the like.

A generally rectangular food compartment 68 is defined in the upper forward portion of the container. Food compartment 68 has an open top to which access may be gained by removing the lid 34 and is defined by sidewalls 28, 30, front wall 24, a bottom wall 38 and a rearwall 40. A pair of generally arcuate chutes 46 are disposed in side-by-side relationship rearwardly of and beneath the food compartment 68. Chutes 46 include a substantially upright portion 46a extending downwardly along the rearwall 26 and a generally horizontal but downwardly inclined portion 46b beneath the bottom wall 38 of food compartment 68. The chutes 46 are separated by a partition 36 extending essentially their entire lengths. Each of the chutes 46 is defined by a bottom wall 50 and a top wall 48 which are spaced apart a distance corresponding to the diameter of a beverage container such as cans 52. The top of each of the chutes 46 is closed by a connecting wall 45 extending between bottom wall 50 and top wall 48.

The bottom of each of the chutes 46 opens into a dispensing station at an opening 56 in the front wall 24 beneath the food compartment 68. The dispensing station includes a notch 62 which allows a hand to be inserted into the opening 56 around the bottom most can 52 to be dispensed. An upwardly extending lip 64 defining the bottom of opening 56 engages a portion of the lowermost can 52, thereby normally preventing escape of the cans 52 until removal thereof by a user. Opening 56 is selectively closed by a dispensing door 58 which is pivotally mounted at the bottom of opening 56 by means of a hinge 60. The opening 56 as well as door 58 extend laterally the entire width of the two dispensing chutes 46.

The bottom wall 50 of each of the chutes 46 is spaced from the rear wall 26 and bottom wall 22 so as to create a dead air space 54 which may be filled with insulation if desired to minimize heat transfer therethrough.

The top wall 48 of the chutes 46 is spaced from the backwall 40 and bottom wall 38 of food compartment 68 thereby defining an ice compartment 42 having a curvature generally similar to the chutes 46. Ice compartment 42 extends substantially the entire width of the chest and is defined by a substantially vertical portion 42a in back of the rearwall 40 and a substantially horizontal portion 42b immediately beneath the bottom wall 38. The bottom portion 42b of the ice compartment 42 is closed by a connecting wall 66 extending between bottom wall 38 and top wall 48, thereby preventing escape of fluid or cool air from the bottom of the ice compartment 42. The top of the ice compartment 42 includes an opening 44 through which ice may be introduced into the ice compartment 42 when the lid 34 is removed.

In use, food items are loaded into the food compartment 68 by removing lid 34. Likewise, with lid 34 removed ice in crushed form or the like may be inserted into the opening 44 of ice compartment 42. The ice is drawn by gravity into the bottom portion 42b and eventually fills up to the opening 44. The cans 52 are loaded into the chutes 46 by inserting them into the openings 56 and successively forcing the cans 52 rearwardly through the bottom portion 46b of the chute 46. This loading procedure forces the cans upwardly into the upper portion 46a and each train of cans is held in place by the lip 64. By virtue of the configuration of the chute 46 and the inclination thereof, gravity induces the cans 52 to roll downwardly and forwardly within the chutes 46 to the dispensing station where the user may use a hand to choose and remove a can from either of the chutes 46. Thus, it is apparent that two pluralities of the same or different types of beverages may be quickly and conveniently dispensed through the beverage dispensing door 58. For example, soft beverages may be loaded into one of the chutes 46 while hard beverages may be loaded into the other chute 46.

Ice within the ice compartment 42 chills both the food compartment 68 as well as the cans 52 in each of the chutes 46. By virtue of the configuration of the ice compartment 42, the cooling source is well distributed within the chest, extending substantially the entire length of each of the chutes 46 and along both the backwall 40 and bottom wall 38 of the food compartment 68, If desired, walls 38, 40 and 48 may be constructed of materials which are highly conductive of heat to promote the cooling effect. Also, in order to increase the cooling effect, the top edge 41 of backwall 40 may be spaced slightly below the lid 34 to allow cool air to flow from the ice compartment 42 into the food compartment 68. Similarly, apertures may be provided in the connecting wall 45 to permit cool air to flow from the ice compartment 42 into each of the chutes 46.

Figure 4:
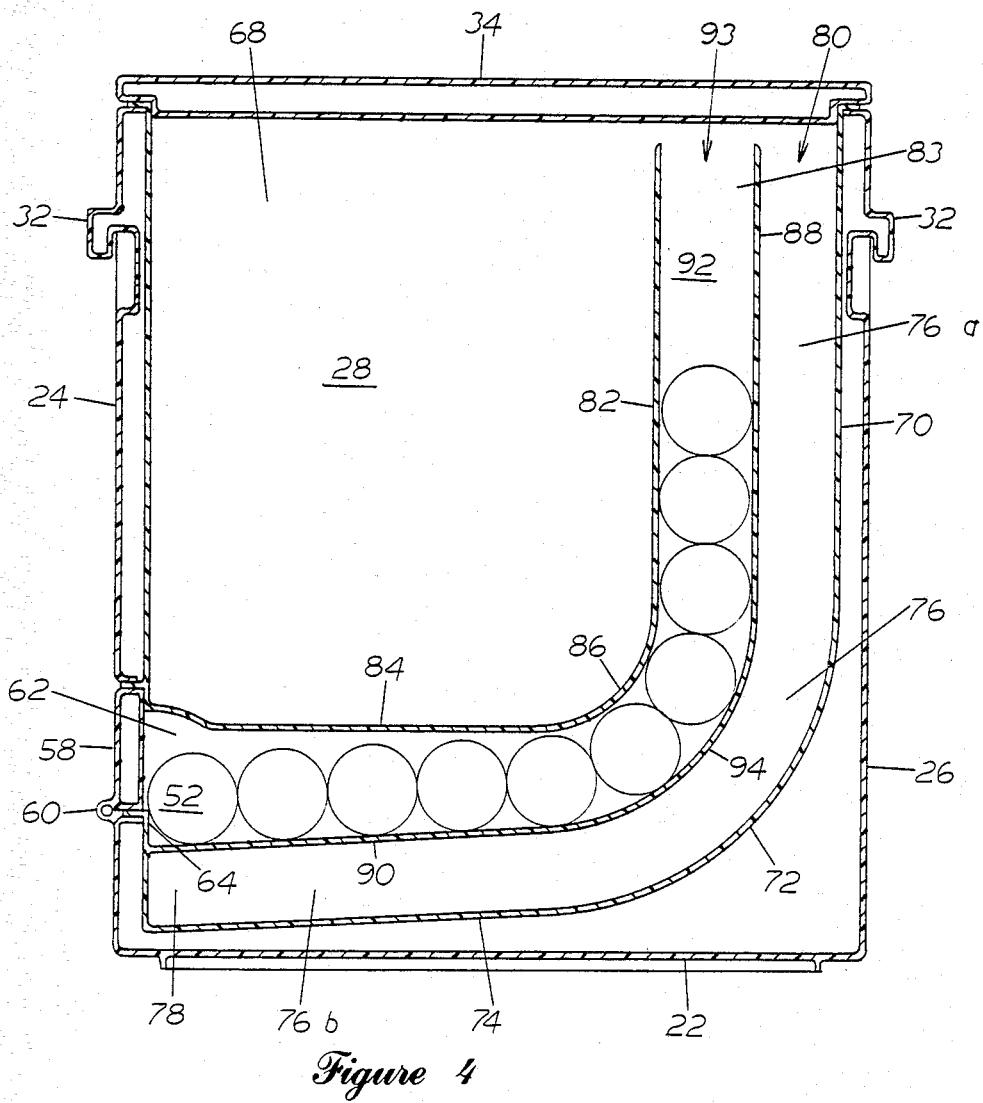
FIG. 4 is a view similar to FIG. 2 but showing an alternate form of the ice chest.

Attention is now directed to FIG. 4 which depicts a chest similar to chest 20 shown in FIGS. 1-3 but wherein the ice compartment 76 is disposed on the outside of the can dispensing chutes 83. Chutes 83 are essentially identical to chutes 46 previously described in overall geometric configuration and in the manner in which the cans 52 are delivered to a dispensing station to which access is gained through dispensing door 58. The top or inner wall of the chutes 83, however, is defined by a continuous wall common to the food compartment 68. Thus, the inner wall of chutes 83 is defined by substantially upright section 82 connected to a substantially horizontal section 84 by a curved section 86. The outer wall of the chutes 83 is defined by an upper section 88 connected to a lower section 90 by a curved section 94. Chutes 83 are centrally divided throught their lengths by a partition 92.

An ice compartment 76 is defined between the chutes 83 and a second wall defined by an upper portion 70 and a lower portion 74 connected by a curved portion 72. Ice compartments 76 therefore includes a lower, substantially horizontal portion 76b which is closed by the forward wall 24 of the chest and a substantially vertical portion 76a terminating in an opening 80 through which ice is introduced into the ice compartments 76. Upper wall portions 82 and 88 of the chutes 83 terminate at their upper extremities to define an opening 93 through which cans 52 may be loaded into the chutes 83 from the top of the chest; this open top feature of the chutes may be employed with the other embodiments of the chest disclosed herein.

Figure 7:
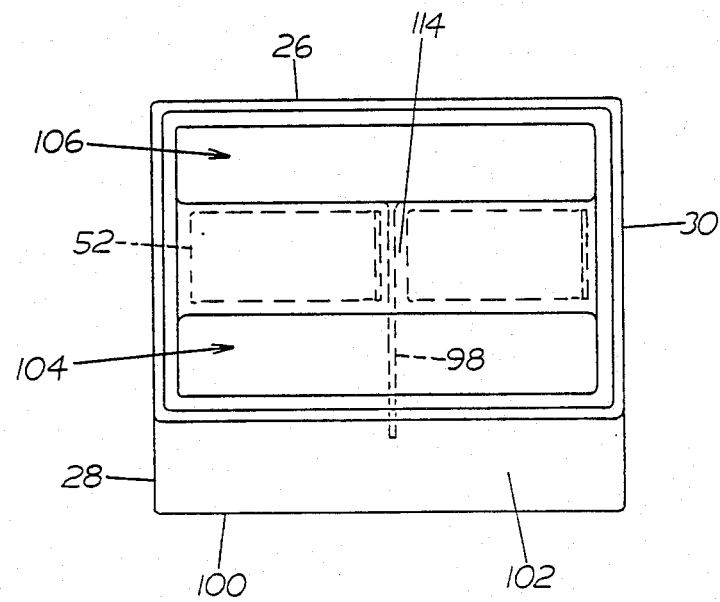
FIG. 7 is a top plan view of the ice chest shown in FIG. 5 but with the lid removed.

Attention is now direction to FIGS. 5–7 where still another form of the chest of the present invention is depicted which is intended solely for storing, cooling and dispensing one or more pluralities of beverage containers, such as cans 52. A pair of sidewalls 28, 30, a front wall 100, a rear wall 26 and a bottom wall 22 are joined together to form an enclosure covered by a removable lid 34. A carrying handle 96 is pivotally mounted by any suitable means on sidewalls 28, 30. The lower porton 102 of front wall 100 curves outwardly to form an extension on the front of the chest. A door 58 is pivotally attached to the chest by a hinge 60 and permits access to a dispensing station as described previously.

A pair of can dispensing chutes 108 are disposed in side-by-side relationship to each other and are each defined by a pair of walls 110, 112 which extend downwardly and forwardly toward the opening 56 in the front wall 100. The dispensing chutes 108 are separated by a partition 98 which extends downwardly through the chutes 108 to a point adjacent the dispensing station. Wall 110 is spaced rearwardly of and extends generally parallel to the front wall 100 including the curved portion thereof 102, thereby defining a forward ice compartment 104 on one side of the chutes 108. An internal, arcuately shaped wall 113 is spaced rearwardly of and is generally parallel to wall 112, thereby defining a second ice compartment 106 disposed rearwardly and below the chutes 108. Ice compartments 104 and 106 extend substantially the entire width of the chest between sidewalls 28 and 30 and are substantially coextensive with the length of chutes 108. A connecting wall 114 between walls 110 and 112 is spaced slightly below the lid 34 thereby placing the ice compartments 104, 106 in air flow communication with each other. In view of the foregoing it is readily apparent that the ice chest disclosed in FIGS. 5–7 provides a pair of ice compartments which are segregated from the dispensing chutes, but yet which cool both sides of such chutes along substantially the entire length thereof.

Referring now to FIGS. 8 and 9, another form of the chest of the present invention is particularly adapted to sequentially dispense either of a plurality of beverage containers from a pair of side-by-side chutes 132 similar to those previously described and also includes a seat particularly adapted to conform to the human anatomy. The chest is substantially L-shaped in cross-section. A pair of L-shaped sidewalls 124, 126 are joined together by a bottom wall 22, a rear wall 138, an intermediate top wall 118 and a pair of front walls 116, 120. Top wall 118 extends between front walls 116 and 120 and possesses a slight curvature defining a seat. Front wall 116 extends upwardly from wall 118 and is slightly rearwardly inclined to define a backrest. A handle 122 may be formed in the front wall 120 immediately beneath seat 118 which, in combination with a molded grip 133 in rear-wall 138 allow easy carrying of the chest.

A lid 34 is removably mounted on the top of the chest and permits access to an L-shaped ice compartment 130 which is substantially co-extensive with the seat 118 and backrest 116. Spaced behind the ice compartment 130, and substantially co-extensive therewith are a pair of dispensing chutes 132 defined by a pair of spaced apart walls 134 and 140 similar to those previously described. The chutes 132 are in side-by-side relationship with each other and are separated from each other by a suitable partition 135. A connecting wall 136 extending between walls 134 and 140 adjacent the top of the chest close off the upper end of the dispensing chutes 132. A dispensing station in the front wall 120 beneath the seat 118 allows loading and dispensing of the cans 52 as previously described. The chest depicted in FIGS. 8 and 9 is particularly well suited to cool the beverage containers. The ice compartment 130 not only functions to cool the containers and insulates a user's body heat from such containers, but also provides a cooling effect for the user sitting on seat 118.

Figure 12:
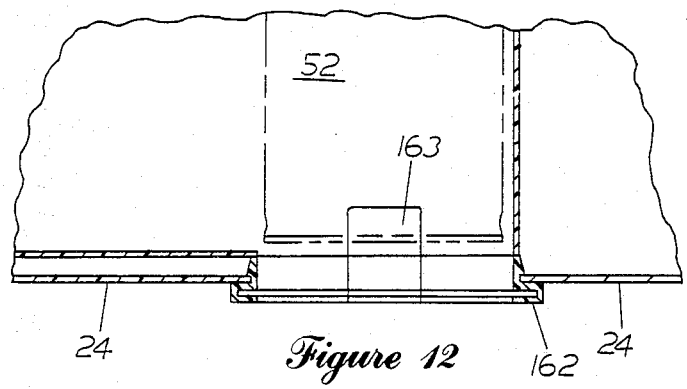
FIG. 12 is a conventional view taken along the line 12—12 of FIG. 10.
Figure 11:
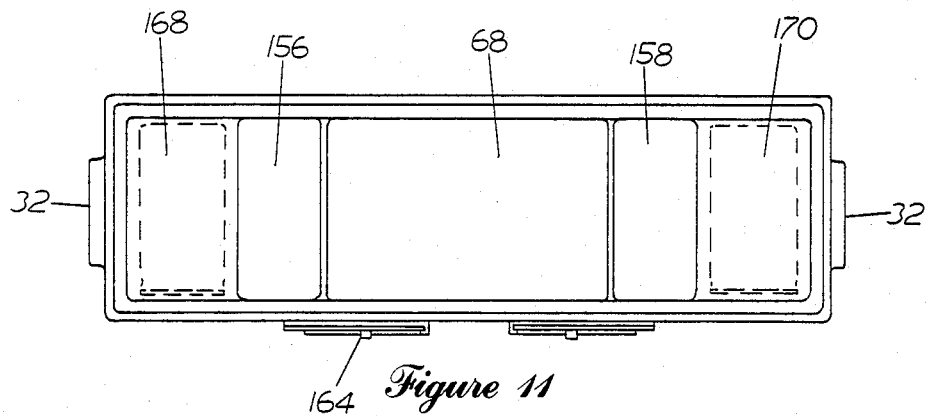
FIG. 11 is a top plan view of the ice chest shown in FIG. 10 but with the lid removed.
Figure 10:
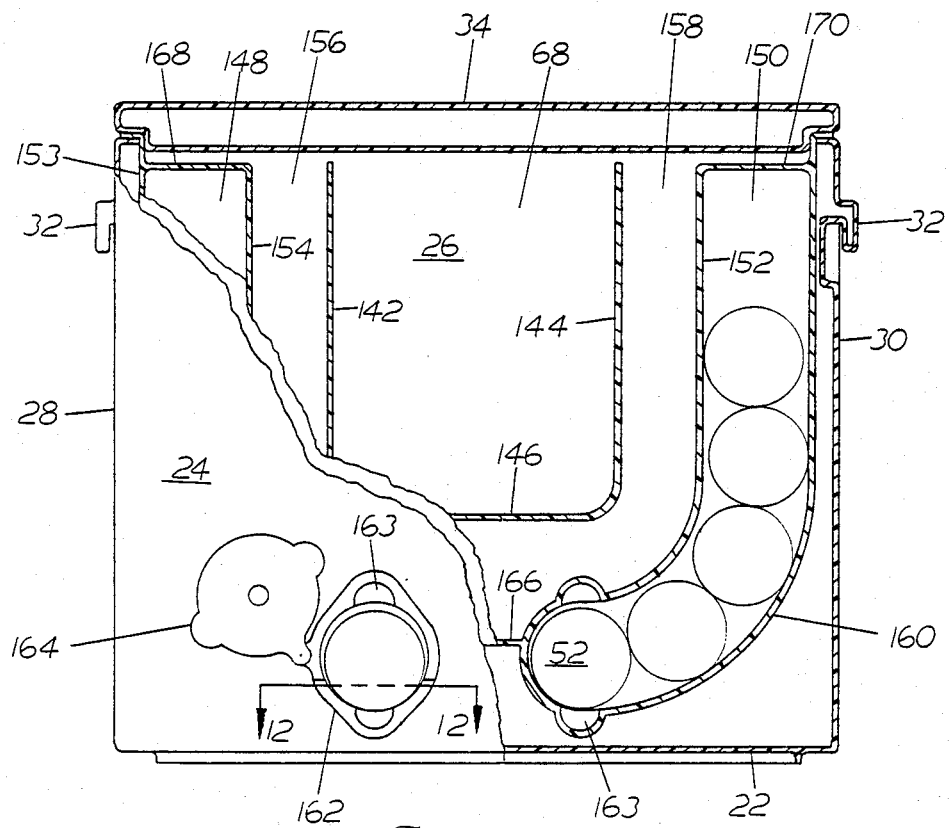
FIG. 10 is a front view of still another form of the ice chest of the present invention, portions being broken away in section to reveal the interior construction of the ice chest.
Figure 16:
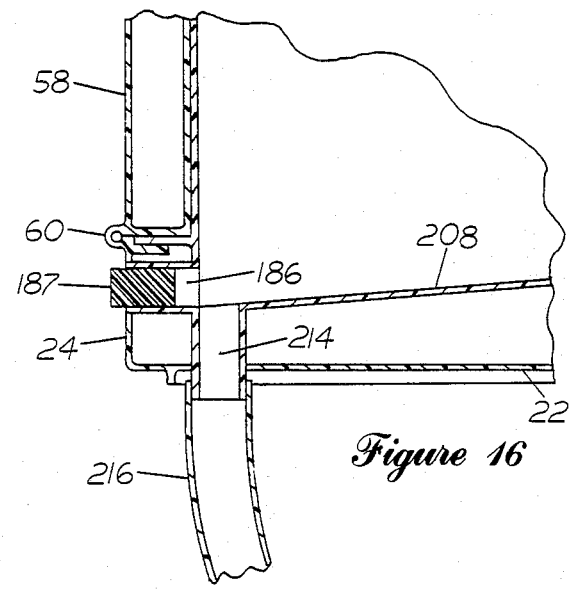
FIG. 16 is a sectional view taken along the line 16—16 in FIG. 13.
Figure 15:
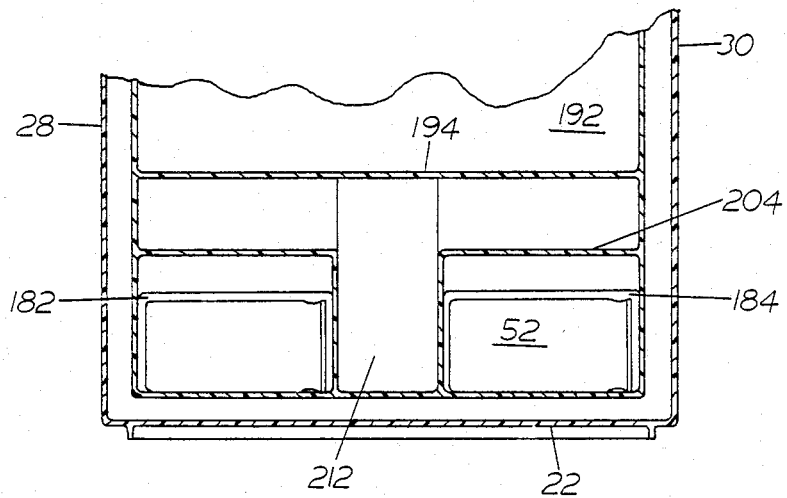
FIG. 15 is a sectional view taken along the line 15—15 in FIG. 14.

Still another form of the chest is shown in FIGS. 10–12, which comprises an enclosure defined by a front wall 24, rear wall 26, sidewalls 28, 30 and bottom wall 22. A lid 34 is removably disposed on the open top of the enclosure. A substantially rectangularly shaped food compartment 68 is centrally disposed within the enclosure and is defined by spaced apart, lateral walls 142, 144, rear wall 26, front wall 24 and bottom wall 146 which is suitably spaced above bottom wall 22. A pair of arcuately shaped, container dispensing chutes 148 and 150 extend downwardly from the corresponding sidewalls 28, 30 and toward each other to a dispensing location beneath the food compartment 68. Chute 148 is defined by parallel walls 153 and 154 joined together at the top thereof by connecting wall 168. Chute 150 is similarly formed by a pair of spaced apart walls 152, 160 joined by a connecting wall 170. The front wall 24 includes a pair of adjacent dispensing openings 162 having a pair of opposing finger cutouts 163 which allow insertion of a user's fingers into the opening 162 and around one of the containers 52. A pair of closure plates 164 are swingably mounted on front wall 24 for closing the dispensing openings 162 when not in use.

Lateral walls 142 and 144 are respectively spaced laterally inwardly from walls 154, 152 and a connecting wall 166 extending between walls 152,154 to define a pair of ice compartments 156, 158 which extend downwardly and communicate with each other beneath the bottom wall 146. It may thus be appreciated that a U- shaped ice compartment is formed around the food compartment 68 which also is substantially co-extensive with the dispensing chutes 148, 150.

Attention is now directed to FIGS. 13-16 wherein still another form of the chest of the present invention is depicted. The chest comprises a pair of opposing sidewalls 28, 30, a stationary top wall 174, a lower front wall 24 and a bottom wall 22 joined together to form a substantially rectangular enclosure. A rectangular door 172 is pivotally mounted by means of a hinge or the like along one edge of the front of the chest and may be pivoted open to expose a forward facing opening 189 which provides access to a food compartment. and is defined by sidewalls 28, 30, top wall 174, bottom wall 194 which is spaced above bottom wall 22 and a rear wall 192 which is spaced forwardly of rear wall 26.

An ice chute 176 in the upper right hand corner of the front face of the chest is defined by a pair of intersecting walls 188, 190 which extend rearwardly to an ice compartment 196 which is substantially L-shaped in cross section. Ice compartment 196 is defined by rear wall 192, bottom wall 194 and one wall 202 of a pair of side-by-side container dispensing chutes 198. The bottom end of the ice compartment 196 is closed by a connecting wall 203. The ice compartment 196 extends substantially the entire width between the sidewalls 28 and 30 and extends rearwardly into a vertically extending space 212 defined by partitions 178 and 180 between the chutes 198.

The chutes 198 comprise a pair of spaced apart, curved walls 202, 208 which extend downwardly from the top of the rear wall 26 and forwardly to define a pair of dispensing openings 182, 184. A dispensing door 58 is hinged at 60 along the top edge of lower wall 24 thereby forming a closure over dispensing openings, 182, 184.

A drain hole 214 extending through walls 208 and 22 within the opening 212 communicates with the ice compartment 196 and permits draining of melted ice through a tube 216 which may be provided with a valve 210 for controlling flow. Alternatively, a drain aperture 186 and corresponding plug 187 are provided in the lower front wall 24 to provide the same drainage function.

The ice chest shown in FIGS. 13-16 is particularly well suited as a small, but not necessarily portable ice box for use in a camper, boat, etc. The door 172 provides easy access to both the food compartment and ice chute 176 to allow filling the ice compartment 196 with ice. The drain holes 186, 214 provide a convenient means of draining the ice compartment 196 without the need for lifting the chest. It is readily apparent that drains of the type described immediately above may be used with the other forms of the ice chest previously described hereinabove. It is further apparent that access may be gained to either of the can dispensing openings 182, 184 without opening the door 172 and that particularly efficient cooling is effected of both the food items and beverage containers by virtue of the fact that the ice compartment 196 is interposed between the chutes 198 and food compartment.

In view of the foregoing, it is apparent that the chests described above not only provides for the reliable accomplishment of the objects of the invention but do so in a particularly efficient and economical manner. It is recognized, of course, that those skilled in the art may make various modifications or additions to the preferred embodiment choosen to illustrate the invention with departing from the scope and spirit of the present contribution to the art. Accordingly, it is to be understood that the protection sought and to be afforded hereby should be deemed to extend to the subject matter claimed and all equivalents thereof fairly within the scope of the invention.

I claim:

1. An ice chest for storing and cooling comestibles, comprising:
    an enclosure including two opposing sidewalls, a front wall, a rear wall and bottom;
    a cover removably mounted on the top of said enclosure;
    a downwardly extending chute within said enclosure, said chute being adapted to store and dispense a plurality of beverage containers and including an upper end and a lower end, said lower end having an opening and therein through which said containers are dispensed, said chute further including first and second portions disposed laterally in side-by-side relationship to each other and each defining an individual path along which a group of said containers may travel during dispensing thereof and a partition in said chute between said first and second portions thereof.

2. The ice chest of claim 1, wherein said chute extends forwardly within said enclosure from upper portions of said rear wall to lower portions of said front wall.

3. The ice chest of claim 1, wherein said front wall includes:
    a dispensing opening adjacent the bottom thereof through which said containers may be dispensed, said dispensing opening communicating with said opening in said lower end of said chute; and
    means for selectively closing said dispensing opening.

4. The ice chest of claim 3, including means adjacent said dispensing opening for engaging a portion of a container at said dispensing opening within said chute and preventing escape of said container from said chest caused by the influence of gravity.

5. An ice chest for storing and cooling comestibles, comprising:
    an enclosure including two opposing sidewalls, a front wall, a rear wall and a bottom;
    a downwardly extending chute within said enclosure, said chute being adapted to store and dispense a plurality of beverage containers and including an upper end and a lower end, said lower end havng an opening therein through which said containers are dispensed;
    an ice compartment within said enclosure within which ice may be introduced for cooling said comestibles, said ice compartment being immediately adjacent and in heat transferring relationship to said chute, said ice compartment having an upper end and a lower end and being substantially coextensive with said chute, said upper end of said ice compartment including an opening therein to permit introduction of ice into said ice compartment, said lower end of said ice compartment being closed to prevent escape of cool air therefrom; and,
    a food compartment within said enclosure, said food compartment including an open top to which access may be gained through the top of said enclosure, said ice compartment being interposed between said food compartment and said chute, said chute being disposed in heat transferring relationship to said food compartment.

6. The ice chest of claim 5, wherein said food compartment includes a bottom wall and a rear wall each substantially coextensive with said ice compartment.

7. The ice chest of claim 1, wherein said chute is interposed between said ice compartment and said food compartment.

8. The ice chest of claim 1, wherein said upper end of said chute is closed.

9. The ice chest of claim 1, wherein said ice compartment extends across essentially the entire width of said enclosure, said ice compartment extending forwardly within said enclosure from upper portions of said rear wall to lower portions of said front wall.

10. The ice chest of claim 1, wherein said ice compartment includes first and second discrete sections respectively on opposite sides of said chute.

11. The ice chest of claim 14, wherein said first section is disposed between said chute and said front wall and said second section is disposed between said chute and said rear wall.

12. An ice chest for storing and cooling comestibles, comprising:
    an enclosure including two opposing sidewalls, a front wall, a rear wall and a bottom;
    a cover removably mounted on the top of said enclosure;
    a downwardly extending chute within said enclosure, said chute being adapted to store and dispense a plurality of beverage containers and including an upper end and a lower end, said lower end having an opening therein through which said containers are dispensed; and
    an ice compartment within said enclosure within which ice may be introduced for cooling said comestibles, said ice compartment being immediately adjacent and in heat transferring relationship to said chute, said ice compartment having an upper end and a lower end and being substantially coextensive with said chute, said upper end of said ice compartment including an opening therein to permit introduction of ice into said ice compartment, said lower end of said ice compartment being closed to prevent escape of cool air therefrom,
    said chute and said ice compartment each including a generally vertically extending portion and a generally horizontal portion,
    said enclosure including a seat opposite said vertical portion and a backrest opposite said horizontal portion to allow a person to sit on said ice chest.

13. The ice chest of claim 12, wherein said ice compartment is interposed between said chute and the combination of said seat and said backrest.

14. The ice chest of claim 12, wherein said enclosure is substantially "L" shaped in cross-section.

15. The ice chest of claim 12, wherein said front wall includes a dispensing opening therein through which said containers are dispensed from said chute, said dispensing opening being disposed beneath said seat.

16. A portable ice chest for storing and cooling food and beverages, comprising:
    a bottom wall, a pair of sidewalls, a front wall and a rear wall joined together to define an enclosure having an open top;
    a lid removably mounted on said top of said enclosure for closing said open top;
    a food compartment within said enclosure in which food may be introduced through said open top, said food compartment including a bottom and a back wall;
    an ice compartment within said enclosure, said ice compartment including a first section below said bottom and a second section rearward of said back wall; and
    at least one chute within said enclosure for storing and sequentially dispensing a first plurality of beverage containers, said chute including a first portion interposed between said first section of said ice compartment and said bottom wall and a second portion interposed between said back wall and said rear wall,
    whereby ice in said ice compartment cools said food and said beverage containers.

17. The portable ice chest of claim 16, wherein said food compartment and said ice compartment extend the entire width of said enclosure between said said sidewalls.

18. The portable ice chest of claim 16, wherein said ice compartment includes an upper end and a lower end, said upper end having an opening therein adjacent said open top to allow the introduction of ice into said ice compartment, said ice compartment having a lower end, said lower end being closed to prevent the escape of cool air and melting liquid therefrom.

19. The portable ice chest of claim 16, wherein said chute is inclined within said enclosure to provide gravity induced dispensing of said beverage containers, said chute having an opening in a lower section thereof through which said beverage containers may be dispensed.

20. The portable ice chest of claim 19, wherein said front wall includes dispensing opening therein disposed below said food compartment and communicating with said opening in said chute to allow access to said beverage containers.

21. The portable ice chest of claim 16, including a second chute within said container for storing and dispensing a second plurality of beverage containers and disposed in side-by-side relationship to said one chute, said second chute including a first portion interposed between said first section of said ice compartment and said bottom wall and a second portion interposed between said back wall and said rear wall.

* * * * *